(12) United States Patent
Saint Clair et al.

(10) Patent No.: US 10,649,087 B2
(45) Date of Patent: May 12, 2020

(54) OBJECT DETECTION SYSTEM FOR MOBILE PLATFORMS

(75) Inventors: Jonathan Martin Saint Clair, Seattle, WA (US); William D. Sherman, SeaTac, WA (US); Mitchell D. Voth, Lake Tapps, WA (US); Ronald N. Murata, Normandy Park, WA (US); Bentley Edwin Northon, Auburn, WA (US); James Ridgeway Gillis, Seattle, WA (US); Robert P. Higgins, Seattle, WA (US); David Christien Soreide, Seattle, WA (US); Robert R. Keever, Poulsbo, WA (US); Ordie Dean Butterfield, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 1041 days.

(21) Appl. No.: 13/367,184

(22) Filed: Feb. 6, 2012

(65) Prior Publication Data

US 2013/0201052 A1    Aug. 8, 2013

(51) Int. Cl.
| | |
|---|---|
| *G01S 13/87* | (2006.01) |
| *G01S 17/86* | (2020.01) |
| *G01S 13/86* | (2006.01) |
| *G01S 3/784* | (2006.01) |
| *G01S 17/66* | (2006.01) |

(52) U.S. Cl.
CPC .............. *G01S 17/86* (2020.01); *G01S 3/784* (2013.01); *G01S 13/867* (2013.01); *G01S 17/66* (2013.01)

(58) Field of Classification Search
CPC ...... F41H 11/00; G01S 13/867; G01S 17/023; G01S 17/66; G01S 3/784

USPC ....... 342/54; 356/138, 139.04, 4.01, 51, 614
See application file for complete search history.

(56) References Cited

U.S. PATENT DOCUMENTS

| | | | |
|---|---|---|---|
| 6,215,731 B1 | 4/2001 | Smith | |
| 6,275,283 B1 | 8/2001 | Hasson | |
| 6,804,607 B1 * | 10/2004 | Wood | ............................ 701/301 |
| 7,202,809 B1 * | 4/2007 | Schade et al. | .................. 342/67 |
| 7,400,384 B1 * | 7/2008 | Evans | ................... G01S 7/4811 |
| | | | 356/5.01 |
| 8,245,928 B2 | 8/2012 | Warren | |
| 8,258,998 B2 | 9/2012 | Factor et al. | |

(Continued)

OTHER PUBLICATIONS

Zheng et al., "Developing High-Performance III-V Superlattice IRFPAs for Defense—Challenges and Solutions", Proceedings of SPIE, vol. 7660, Apr. 2010, pp. 1-12.

(Continued)

*Primary Examiner* — Timothy A Brainard
(74) *Attorney, Agent, or Firm* — Yee & Associates, P.C.

(57) ABSTRACT

A method and apparatus comprising a group of passive sensor systems, an active sensor system, and a processor unit. The group of passive sensor systems is configured to generate first sensor information from light in an environment around the group of passive sensor systems. The active sensor system is configured to send signals, receive responses from the signals, and generate second sensor information from the responses. The processor unit is configured to control the active sensor system to send the signals in a direction toward an object using the first sensor information and generate information about the object using the second sensor information.

29 Claims, 11 Drawing Sheets

(56) References Cited

U.S. PATENT DOCUMENTS

| | | | | |
|---|---|---|---|---|
| 8,867,025 B1* | 10/2014 | Smalls | ...................... | G08G 5/04 |
| | | | | 356/28 |
| 2002/0060784 A1* | 5/2002 | Pack | ...................... | G01S 7/481 |
| | | | | 356/6 |
| 2007/0040062 A1* | 2/2007 | Lau et al. | ...................... | 244/3.16 |
| 2010/0208244 A1* | 8/2010 | Earhart | ................. | G01S 3/7867 |
| | | | | 356/139.01 |
| 2010/0253567 A1* | 10/2010 | Factor et al. | ................... | 342/52 |
| 2011/0127328 A1 | 6/2011 | Warren | | |
| 2012/0188467 A1* | 7/2012 | Escuti | ................. | G02B 27/286 |
| | | | | 349/1 |

OTHER PUBLICATIONS

Smith et al., "Two-Color HgCdTe Infrared Staring Focal Plane Arrays", Proceedings of SPIE, vol. 5209, Aug. 2003, pp. 1-13.
EP search report dated Jul. 5, 2013 regarding application 131662605.3-1812, reference P56632EP/RHBH, applicant The Boeing Company, 6 pages.
European Patent Office Examination Report, dated Jul. 20, 2018, regarding Application No. 13162605.3, 5 pages.
European Patent Office Search Report, dated Mar. 23, 2017, regarding Application No. 13162605.3, 5 pages.
European Patent Office Communication and Examination Report, dated Apr. 3, 2019, regarding Application No. 13162605.3, 5 pages.
European Patent Office Action, dated Dec. 16, 2019, regarding Application No. 13162605.3-1206, 6 pages.

* cited by examiner

FIG. 12
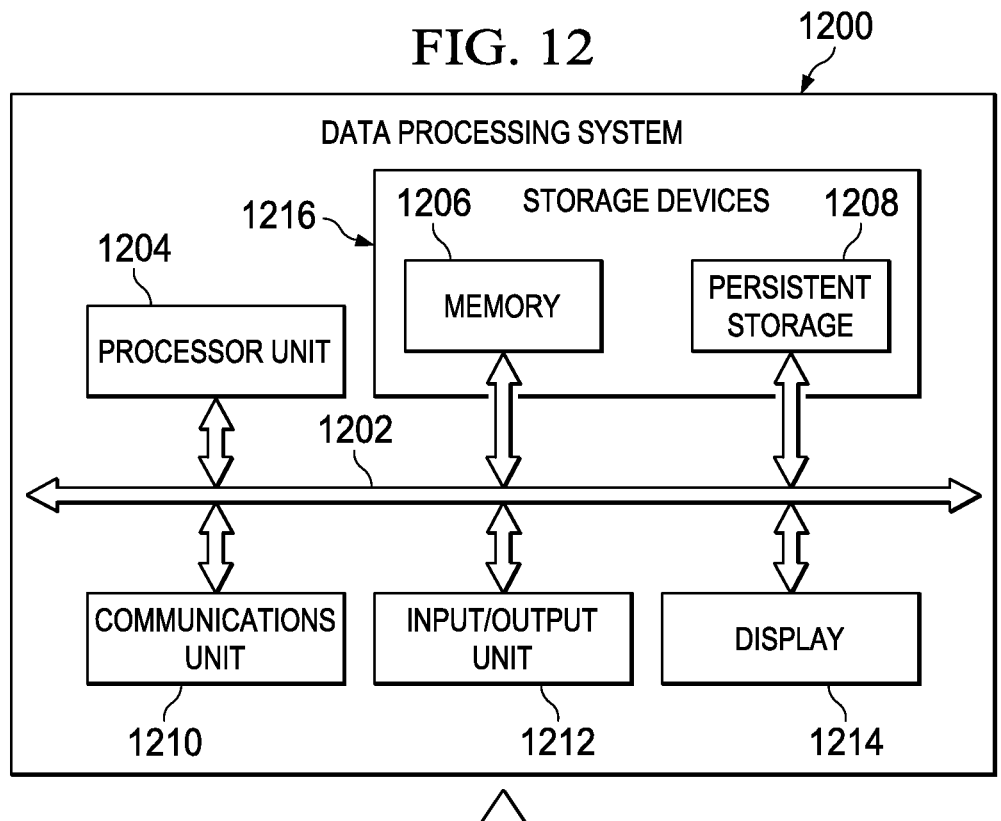
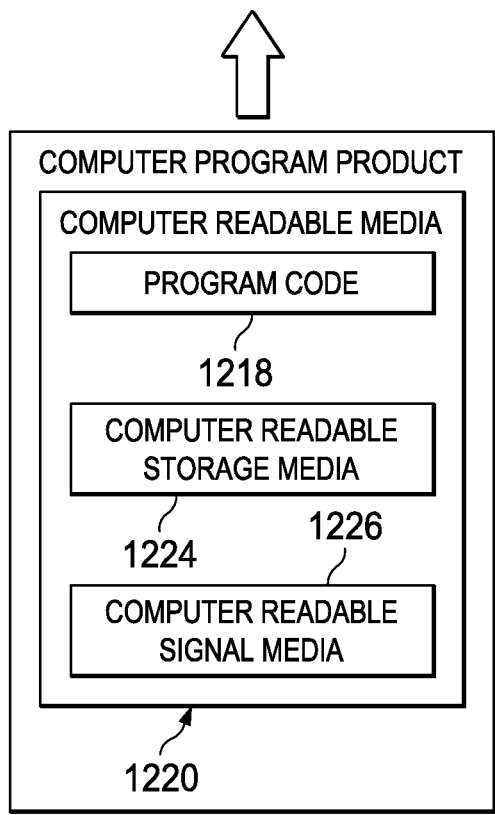

OBJECT DETECTION SYSTEM FOR MOBILE PLATFORMS

BACKGROUND INFORMATION

1. Field

The present disclosure relates generally to detecting objects and, in particular, to a method and apparatus for detecting moving objects and stationary objects by a mobile platform.

2. Background

Sensor systems may be used to generate different types of information about different types of objects. These different types of objects may include, for example, a building, a person, a vehicle, an aircraft, a missile, or some other suitable type of object. As one illustrative example, a sensor system may be used to generate one or more images of an environment in which an object may be located. The object may be a moving object or a stationary object. As used herein, a "moving object" is an object that moves relative to the sensor system. A "stationary object", as used herein, may be an object that does not move with respect to the sensor system.

The one or more images generated by the sensor system may be used to detect an object in the environment captured in the images. Detecting an object may include detecting a presence of the object, identifying the object, identifying a location of the object in the environment, and/or tracking the object. Tracking an object may involve multiple sequential detections of an object over time. Object tracking may be used to monitor the location and/or movement of different types of objects over time.

Different types of sensor systems may be used to perform object detection. These sensor systems may include, for example, radar systems, light detection and ranging systems, laser detection and ranging systems, infrared sensor systems, ultraviolet-based sensor systems, visible light imaging systems, and other suitable types of sensor systems.

These types of sensor systems may be located on land-based platforms, mobile platforms, and other suitable types of platforms. For example, an aircraft may include sensor systems to detect the launch and movement of objects, such as surface and air-launched missiles.

These sensor systems may be part of a missile approach warning system and may provide warning cues to the operator of the aircraft. These cues may allow the operator to perform operations, such as defense maneuvers, activate counter-measures, and perform other suitable actions.

In many situations, the speed at which a presence of an object can be detected and the identification of the object may be of great importance to operations performed using the aircraft. Currently used sensor systems, however, may falsely indicate the presence of a moving object more often than desired. If false positives occur, unneeded actions may be taken by the operator, or the operator may ignore the presence of the actual object.

Further, the currently used sensor systems also may not distinguish between friendly objects and unfriendly objects as well or as quickly as desired. If too much time passes, the object may pose a greater threat to the aircraft. Therefore, it would be desirable to have a method and apparatus that takes into account at least some of the issues discussed above as well as possibly other issues.

SUMMARY

In one illustrative embodiment, an apparatus comprises a group of passive sensor systems, an active sensor system, and a processor unit. The group of passive sensor systems is configured to generate first sensor information from light in an environment around the group of passive sensor systems. The active sensor system is configured to send signals, receive responses from the signals, and generate second sensor information from the responses. The processor unit is configured to control the active sensor system to send the signals in a direction toward an object using the first sensor information and generate information about the object using the second sensor information.

In another illustrative embodiment, a method for detecting an object is present. First sensor information for the object is received from a group of passive sensor systems associated with a platform. Signals from an active sensor system are directed in a direction toward the object using the first sensor information. Responses to the signals are received at the active sensor system. Second sensor information for the object is received from the active sensor system. Information about the object is generated using at least one of the first sensor information and the second sensor information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 12 is an illustration of a data processing system in accordance with an illustrative embodiment.

DETAILED DESCRIPTION

The different illustrative embodiments recognize and take into account different considerations. For example, the different illustrative embodiments recognize and take into account that currently used sensor systems may not detect moving objects as well as desired. For example, some sensor systems may be better suited for detecting a presence of an object while other sensor systems are better suited for identifying types of objects.

The different illustrative embodiments recognize and take into account that radio frequency sensing technologies and infrared imagers have been used to detect and identify objects. These types of sensor systems, however, may not provide the desired level of accuracy in detecting and identifying objects. In particular, currently used systems may provide higher levels of false alarms than desired. Further, currently used systems may not track the movement of objects or identify the objects as well as desired.

Figure 1:
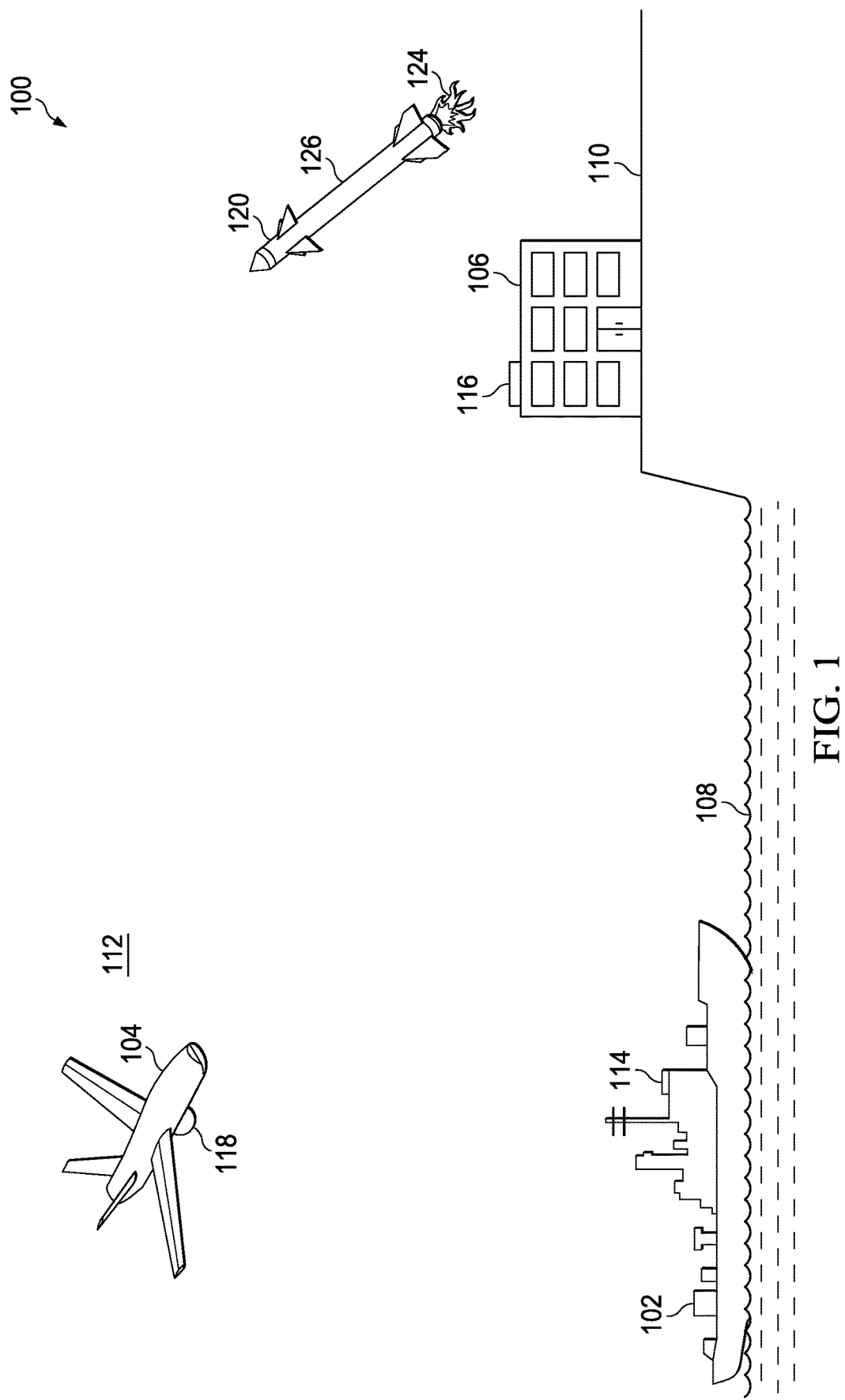
FIG. 1 is an illustration of a sensor environment in accordance with an illustrative embodiment.

With reference now to the figures and, in particular, with reference to FIG. 1, an illustration of a sensor environment is depicted in accordance with an illustrative embodiment. In this illustrative example, sensor environment 100 includes ship 102, aircraft 104, and ground station 106. Ship 102 is on water 108. Ground station 106 is located on land 110, while aircraft 104 is in air 112.

In these illustrative examples, ship 102 has sensor system 114. Further, ground station 106 has sensor system 116, and aircraft 104 has sensor system 118. These sensor systems are configured to detect objects. The detection of objects may include detecting a presence of the object, identifying the object, and tracking movement of the object. In particular, these sensor systems in sensor environment 100 may be configured to detect moving objects, such as missile 120.

Sensor system 114, sensor system 116, and sensor system 118 may be implemented in accordance with an illustrative embodiment. In these illustrative examples, these sensor systems may have a desired field of view and may track and identify missile 120. The identification of missile 120 may be performed by processing images of missile 120. For example, these images may include light from flame 124 of missile 120. The light may be visible light, infrared light, or a combination of the two. Further, the light also may be from light reflecting from surface 126 of missile 120.

Figure 2:
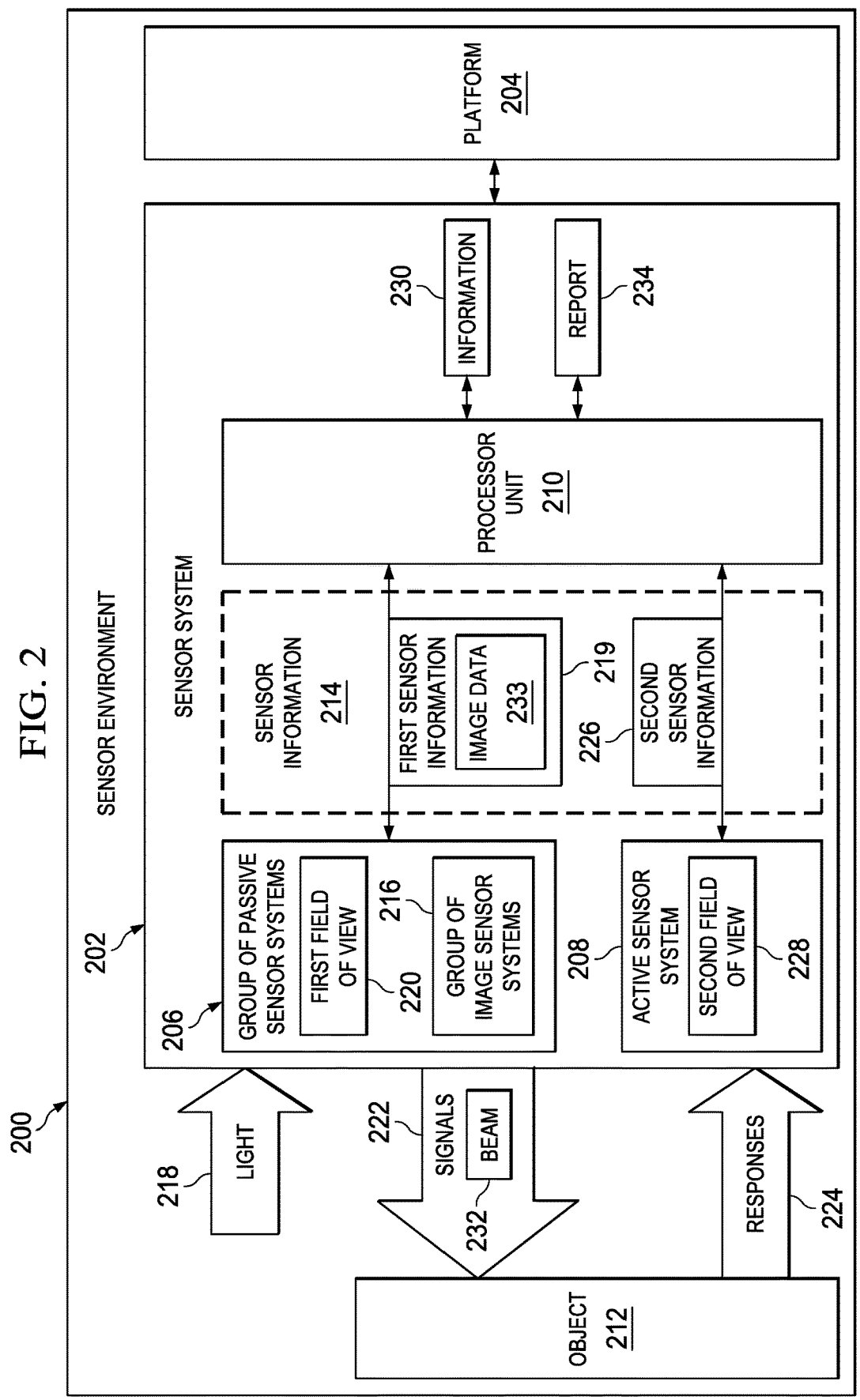
FIG. 2 is an illustration of a block diagram of a sensor environment in accordance with an illustrative embodiment.

Turning now to FIG. 2, an illustration of a block diagram of a sensor environment is depicted in accordance with an illustrative embodiment. Sensor environment 100 in FIG. 1 is an example of an implementation for sensor environment 200 shown in block form in FIG. 2. Sensor environment 200 may be any environment in which a sensor system operates. For example, sensor environment 200 may be in at least one of air, under water, outer space, and other environments.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

As depicted, sensor environment 200 includes sensor system 202, which is associated with platform 204. In the illustrative examples, platform 204 may take a number of different forms.

For example, without limitation, platform 204 may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, and/or some other suitable type of platform. More specifically, platform 204 may be ship 102, aircraft 104, or ground station 106 in sensor environment 100 in FIG. 1.

When one component is "associated" with another component, the association is a physical association in these depicted examples. For example, a first component, sensor system 202, may be considered to be associated with a second component, platform 204, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

As depicted, sensor system 202 comprises group of passive sensor systems 206, active sensor system 208, and processor unit 210. As used herein, a "group", when used with reference to items, means one or more items. For example, "group of passive sensor systems 206" is one or more passive sensor systems.

As used herein, a "passive sensor system", such as one of group of passive sensor systems 206, may detect signals but not transmit signals. In other words, a passive sensor system may generate sensor information based on the detection of signals as compared to the detection of response signals generated in response to the active sensor system transmitting signals. However, an "active sensor system", as used herein, may transmit signals and generate sensor information based off of the response signals received.

As one illustrative example, group of passive sensor systems 206 may take the form of a group of infrared sensor systems. For example, without limitation, group of passive sensor systems 206 may be group of image sensor systems 216 that is configured to generate infrared images. Of course, in other illustrative examples, group of passive sensor systems 206 may take the form of some other suitable type of sensor system.

In this illustrative example, group of passive sensor systems 206 is configured to detect light 218 and generate first sensor information 219 in response to detecting light 218. Light 218 may be light originating from object 212 or from other sources in sensor environment 200. For example, light 218 may be light from a rocket engine in a missile.

In these illustrative examples, group of passive sensor systems 206 has first field of view 220. First field of view 220 is a field of view relative to platform 204. In particular, first field of view 220 is the extent of sensor environment 200 from which group of passive sensor systems 206 may receive light 218 to generate first sensor information 219. First field of view 220 may be all of sensor environment 200 around platform 204 or a portion of sensor environment 200.

In these illustrative examples, each passive sensor system in group of passive sensor systems 206 has a field of view that is a portion of first field of view 220. These portions may overlap, depending on the particular implementation.

First field of view 220 may be measured as a solid angle relative to a sphere around platform 204. In these illustrative examples, this solid angle may the combined angle relative to a sphere around platform 204 formed by the set of angles that each of group of passive sensor systems 206 observes. First field of view 220 may be measured in steradians. This type of measurement describes two-dimensional angular spans in three-dimensional space in the illustrative examples.

In these illustrative examples, active sensor system 208 may be any sensor system configured to transmit signals 222 in a specified direction and receive responses 224 from signals 222. Further, active sensor system 208 generates second sensor information 226 using responses 224. Responses 224 may be the reflections of signals 222 off of one or more surfaces, such as the surface of an object. Active sensor system 208 may take the form of, for example, a radar system, a light detection and ranging system (LIDAR), a laser detection and ranging system (LADAR), an electromagnetic radiation sensor system, or some other suitable type of sensor system configured to transmit signals 222 and receive responses 224.

Responses 224 may be the reflections off of an object that is present within second field of view 228 of active sensor system 208. In these illustrative examples, second field of view 228 is narrower than first field of view 220. Second field of view 228 also may be moved to change the portion of sensor environment 200 covered by second field of view 228. In other words, active sensor system 208 may be configured to direct second field of view 228 towards a particular portion of sensor environment 200. For example, second field of view 228 may be directed to encompass an object in sensor environment 200, such as object 212.

In these illustrative examples, active sensor system 208 may transmit signals 222 in the form of beam 232. Active sensor system 208 may transmit beam 232 that substantially covers second field of view 228 or some portion of second field of view 228.

As depicted, processor unit 210 may receive at least one of first sensor information 219 generated by group of passive sensor systems 206 and second sensor information 226 generated by active sensor system 208 as sensor information 214 for processing. In particular, sensor information 214 may comprise at least a portion of first sensor information 219 and/or at least a portion of second sensor information 226.

Processor unit 210 comprises hardware and, in some cases, also may include software and/or firmware. Processor unit 210 may be implemented using one or more processors. Processor unit 210 uses sensor information 214 to generate information 230 about objects that may be present in sensor environment 200.

When group of passive sensor systems 206 takes the form of group of image sensor systems 216, first sensor information 219 received at processor unit 210 may comprise image data 233. In these illustrative examples, processor unit 210 may use first sensor information 219 to detect objects located within sensor environment 200. The detection of an object in sensor environment 200 may comprise at least one of, for example, without limitation, detecting a presence of an object, identifying an object, and tracking an object. Tracking an object may comprise tracking the movement of an object, tracking the location of an object over time, and/or tracking an object in some other suitable manner. The object detected may be a moving object or a stationary object with respect to group of passive sensor systems 206.

In one illustrative example, processor unit 210 may detect a presence of object 212 from image data 233 in first sensor information 219 received from group of passive sensor systems 206. Image data 233 may include an indication of the presence of object 212 in the depicted examples. For example, processor unit 210 may use image data 233 to detect the presence of object 212 and identify an area in sensor environment 200 in which object 212 is located. In some illustrative examples, processor unit 210 may be configured to estimate a location for object 212 in sensor environment 200.

In some cases, however, image data 233 may not provide the information needed to identify object 212 and/or track object 212. In these cases, processor unit 210 may use first sensor information 219 to direct active sensor system 208 to send signals 222 in a direction towards object 212. Active sensor system 208 may use responses 224 reflected off of object 212 in response to signals 222 encountering object 212 to generate second sensor information 226.

Processor unit 210 may then use second sensor information 226 to generate information 230 about object 212. Information 230 about object 212 may include, for example, without limitation, a distance to object 212, an orientation of object 212, a direction vector to object 212, a location of object 212, an identification of object 212, a determination of whether object 212 is a threat, a track indicating any movement of object 212, a velocity of object 212, and/or other suitable information about object 212.

In some illustrative examples, information 230 may be relative to sensor system 202. For example, a velocity of object 212 may be identified relative to sensor system 202. As another illustrative example, a distance to object 212 may be detected relative to object 212. In this manner, second sensor information 226 generated by active sensor system 208 may provide processor unit 210 with the information needed to identify desired information about object 212 as compared to first sensor information 219 generated by group of passive sensor systems 206. Further, processor unit 210 may use first sensor information 219 to control active sensor system 208 without taking more time and/or effort than desired.

Additionally, processor unit 210 may generate report 234 about object 212 using information 230. Report 234 may include information 230, first sensor information 219, second sensor information 226, information derived from any combination of the above, and/or other suitable information. In some cases, report 234 may include suggested actions, commands that initiate actions, an indication that additional information about object 212 is needed, and/or other suitable information.

The illustration of sensor environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, sensor system 202 may include one or more active sensor systems in addition to active sensor system 208 in FIG. 2. In other illustrative examples, processor unit 210 may be distributed within sensor system 202. For example, processor unit 210 may be present as hardware in group of passive sensor systems 206 and/or active sensor system 208 in addition to or in place of being a separate component as illustrated in FIG. 2. Further, processor unit 210 may comprise software and/or firmware in addition to hardware.

For example, processor unit 210 may comprise multiple processors. In one illustrative example, a processor is present in each passive sensor system in group of passive sensor systems 206 and active sensor system 208. Further, processor unit 210 may also have a processor located remote to group of passive sensor systems 206 and active sensor system 208 to process first sensor information 219 and second sensor information 226.

In one illustrative example, when a portion of processor unit 210 is present in one or more of group of passive sensor systems 206, detection of the presence of object 212 may be performed by one or more of these sensor systems using first sensor information 219. These one or more sensor systems may send an estimated location for object 212 to the portion of processor unit 210 in active sensor system 208. Active sensor system 208 may then use this estimated location for object 212 to direct second field of view 228 and beam 232 towards object 212. In this manner, processor unit 210 may be implemented in any number of ways within sensor system 202 and/or remote to sensor system 202.

Figure 3:
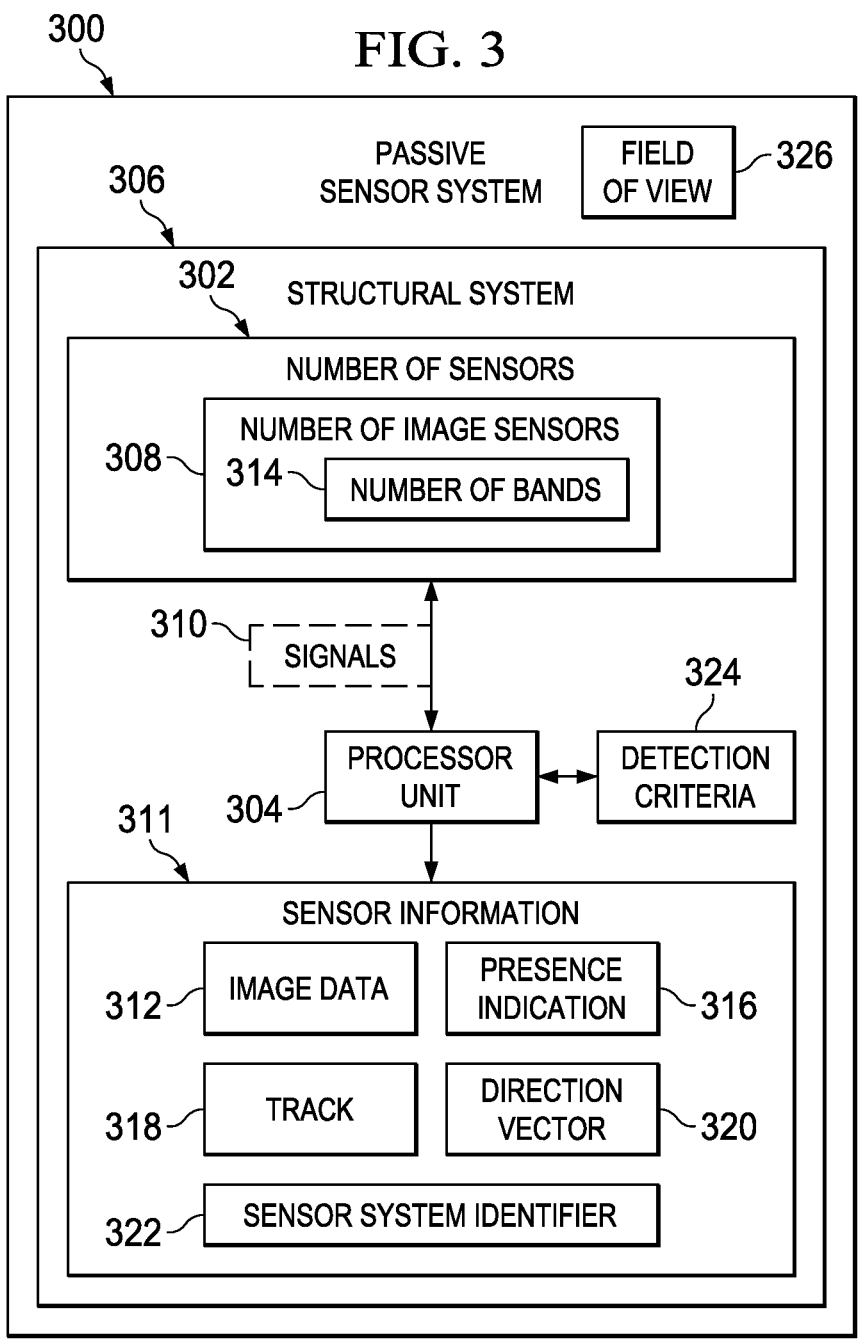
FIG. 3 is an illustration of a block diagram of a passive sensor system in accordance with an illustrative embodiment.

Turning now to FIG. 3, an illustration of a block diagram of a passive sensor system is depicted in accordance with an illustrative embodiment. Passive sensor system 300 is an example of a passive sensor system in group of passive sensor systems 206 in FIG. 2. In some cases, passive sensor system 300 may be an infrared sensor system. In particular, passive sensor system 300 may be an image sensor system configured to respond to infrared light.

As depicted, passive sensor system 300 includes number of sensors 302 and processor unit 304. Number of sensors 302 and processor unit 304 are associated with structural system 306. As used herein, a "number of", when used with reference to items, means one or more items. For example, "number of sensors 302" is one or more sensors.

Processor unit 304 may comprise hardware, software, firmware, or a combination of at least two of the three. In one illustrative example, processor unit 304 may comprise a number of processors. For example, processor unit 304 may comprise a processor associated with each sensor in number of sensors 302. In some cases, each of these processors may be implemented within a corresponding sensor in number of sensors 302.

In these illustrative examples, structural system 306 may be considered part of passive sensor system 300. Structural system 306 may be associated with platform 204 in FIG. 2. Structural system 306 may be, for example, a housing or some other type of structural system configured to support number of sensors 302 and processor unit 304 in passive sensor system 300. For example, structural system 306 may comprise a number of structures configured to support number of sensors 302 in a number of locations on platform 204.

Number of sensors 302 is a number of passive sensors configured to generate signals 310. In these illustrative examples, each of number of sensors 302 is configured to detect electromagnetic radiation in number of bands 314. As used herein, a "band" is described as a range of spectral frequencies. A "band" may also be described as a range of spectral wavelengths. The electromagnetic radiation spectrum comprises radio frequencies, microwaves, infrared (IR) radiation, visible radiation, ultraviolet (UV) radiation, x-rays, and gamma rays. Visible radiation may be referred to as visible light. Ultraviolet radiation may be referred to as ultraviolet light.

Depending on the implementation, each of number of sensors 302 may be configured to respond to a different band in number of bands 314. In some cases, a sensor in number of sensors 302 may respond to more than one band in number of bands 314. In other examples, one or more of number of sensors 302 may respond to a same band or group of bands in number of bands 314.

In one illustrative example, number of sensors 302 may be number of image sensors 308 configured to respond to number of bands 314 of infrared light. In other words, number of image sensors 308 may generate signals 310 in response to the detection of infrared light within number of bands 314. In some cases, number of sensors 302 may be a number of digital cameras configured to detect infrared light. Of course, in other illustrative examples, number of sensors 302 may be a number of color sensors configured to detect different colors of visible light.

Signals 310 generated by number of sensors 302 may be processed by processor unit 304 to generate sensor information 311. Sensor information 311 may be an example of at least a portion of first sensor information 219 generated by group of passive sensor systems 206 in FIG. 2.

As depicted, sensor information 311 includes image data 312. Image data 312 may take the form of one or more images and also may include other information. For example, image data 312 may include metadata describing the one or more images in image data 312. Further, metadata in image data 312 may also include at least one of a timestamp, a location of group of passive sensor systems 206, and/or other suitable information.

Image data 312 may be used by, for example, processor unit 210 in FIG. 2 for detecting the presence of an object or identifying an object. Having more than one band in number of bands 314 that number of sensors 302 responds to may be useful in detecting the presence of an object in a particular environment. Further, having more than one band in number of bands 314 may be useful in identifying the object.

For example, when more than one band is present in number of bands 314, distinguishing between different types of rocket motors in an object may be easier to perform using image data 312. Further, with multiple bands in number of bands 314, clutter that may be detected when number of bands 314 is a single band may be reduced.

In these illustrative examples, sensor information 311 may include other information in addition to or in place of image data 312. For example, sensor information 311 may include at least one of presence indication 316, track 318, direction vector 320, sensor system identifier 322, and other suitable information in addition to or in place of image data 312.

Presence indication 316 is an indication that the presence of an object, such as object 212, has been detected in sensor environment 200 in FIG. 2. Presence indication 316 is generated when processor unit 304 determines that detection criteria 324 have been satisfied based on the processing of signals 310. Processor unit 304 may use any number of algorithms to determine whether detection criteria 324 have been met using signals 310.

Track 318 is a path along which an object, such as object 212, moves over time within sensor environment 200. This path may be an angular path relative to passive sensor system 300. Direction vector 320 may be a vector that points towards a direction of an object, such as object 212 in sensor environment 200, relative to passive sensor system 300.

Direction vector 320 may include an angle relative to passive sensor system 300 associated with structural system 306. Sensor system identifier 322 identifies passive sensor system 300 within group of passive sensor systems 206.

In these illustrative examples, processor unit 304 generating presence indication 316, track 318, direction vector 320, and/or other suitable information for an object may be considered part of detecting that object. In this manner, detecting an object may be performed at least partially by processor unit 304 and/or at least partially by processor unit 210 in FIG. 2.

Passive sensor system 300 may send sensor information 311 to processor unit 210 in FIG. 2 as part of first sensor information 219 in sensor information 214. When sensor information 311 includes presence indication 316 for object 212, processor unit 210 may use direction vector 320 for object 212 detected to control active sensor system 208 to direct signals 222 in the direction towards object 212. In particular, the directing of signals 222 towards object 212 may involve steering beam 232 such that beam 232 points at object 212.

Further, in processing sensor information 311, processor unit 210 may use sensor system identifier 322 in sensor information 311 to identify field of view 326 for passive sensor system 300. Field of view 326 is at least a portion of first field of view 220 for group of passive sensor systems 206 in these illustrative examples. As a result, the identification of field of view 326 identifies the portion of first field of view 220 in which an object, such as object 212, may be present when presence indication 316 is included in sensor information 311.

When sensor information 311 includes presence indication 316 for object 212, processor unit 304 may use field of view 326 identified for passive sensor system 300 to control active sensor system 208 to direct beam 232 towards object 212 within field of view 326. The use of field of view 326 may be used in addition to or in place of direction vector 320 to direct signals 222.

In this manner, when a particular passive sensor system in group of passive sensor systems 206 detects an object, such as object 212, a particular field of view for the particular passive sensor system provides a basis for directing signals 222 in the direction of that object. In other words, by knowing object 212 is within a particular field of view, processor unit 210 may more quickly guide signals 222 from active sensor system 208 in a direction towards object 212.

Figure 4:
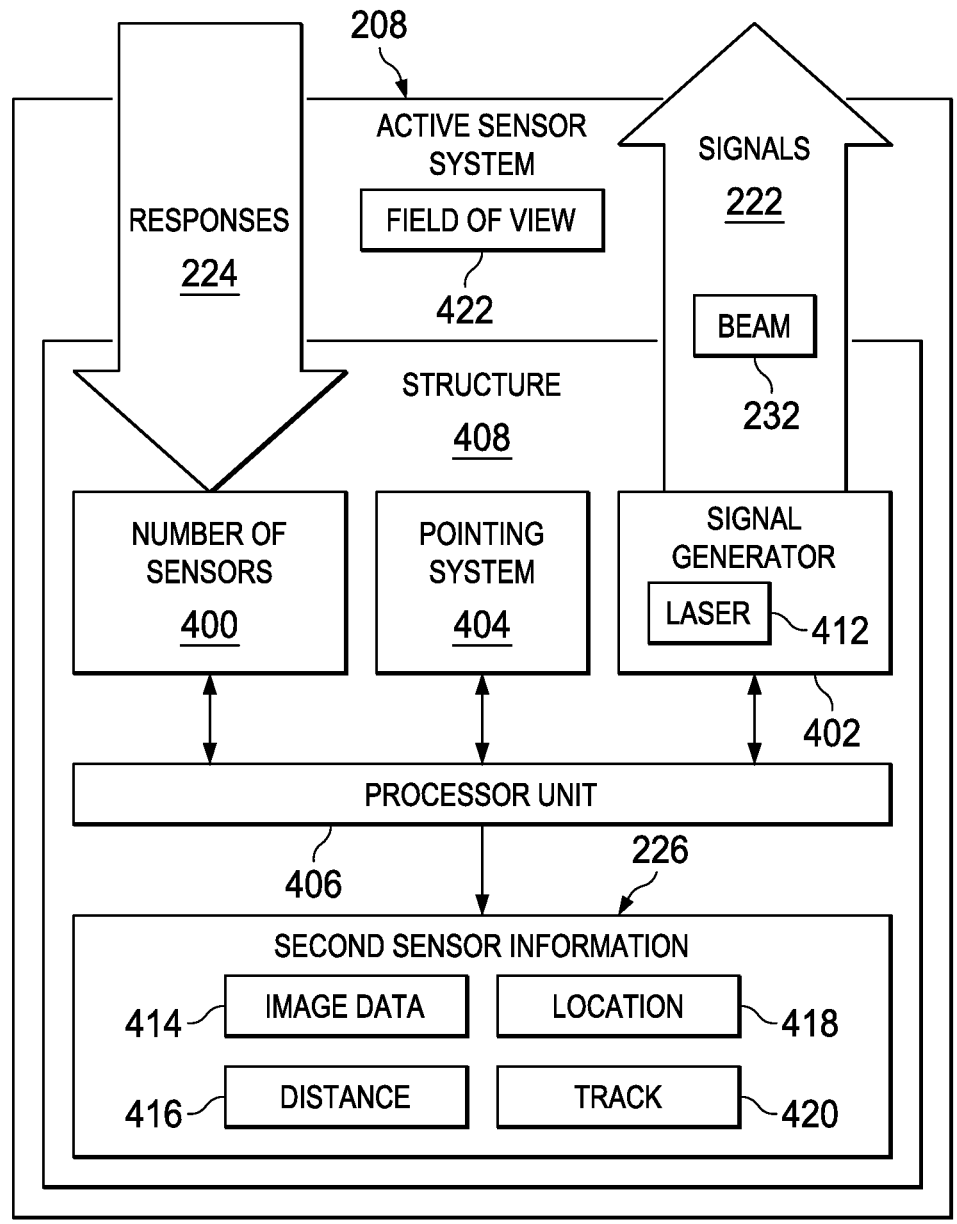
FIG. 4 is an illustration of an active sensor system in accordance with an illustrative embodiment.

Turning now to FIG. 4, an illustration of an active sensor system is depicted in accordance with an illustrative embodiment. In FIG. 4, an example of one implementation for active sensor system 208 is shown. In this illustrative example, active sensor system 208 is configured to send signals 222 in a particular direction. In this illustrative example, active sensor system 208 may be a light detection and ranging system.

As depicted, active sensor system 208 comprises number of sensors 400, signal generator 402, pointing system 404, and processor unit 406. Number of sensors 400, signal generator 402, pointing system 404, and processor unit 406 may be associated with structure 408. Structure 408 may be associated with platform 204 in FIG. 2.

In this illustrative example, signal generator 402 is configured to generate signals 222. Signals 222 may comprise any spectral region within the electromagnetic spectrum. As one specific example, signals 222 may comprise light in the form of visible light, ultraviolet light, near-infrared light, or some other form of light. The wavelength of the light may be, for example, from about 250 nanometers to about 1,700 nanometers.

Signal generator 402 is configured to transmit signals 222 in the form of beam 232. When signals 222 comprise light, beam 232 may be referred to as a beam of light. In one illustrative example, signal generator 402 takes the form of laser 412.

Pointing system 404 is configured to change the direction at which signals 222 are transmitted. In other words, pointing system 404 is configured to point signals 222 in a particular direction. Pointing system 404 comprises hardware and software in this illustrative example. In some cases, pointing system 404 may comprise firmware. Pointing system 404 may change the direction of signals 222 in a number of different ways. For example, pointing system 404 may change the position of structure 408.

In other illustrative examples, pointing system 404 may change the manner in which signals 222 are generated and/or transmitted to change the direction in which signals 222 are transmitted by signal generator 402. In other words, signals 222 may be generated in a manner similar to those used in a phased array antenna system to form beam 232. For example, beamforming techniques may be used to transmit beam 232 in a particular direction.

Pointing system 404 also may be used to take into account movement that may be present in platform 204. This movement may be a movement of platform 204 as a whole, movement of different components in platform 204, or vibrations in platform 204.

For example, vibrations in platform 204 may change the direction at which signals 222 are transmitted from a desired direction. Pointing system 404 may take into account these vibrations to change the transmission of signals 222 such that they continue to be directed in the desired direction within selected tolerances in the presence of these vibrations and/or other movement may be present.

In this illustrative example, number of sensors 400 is configured to detect responses 224 received in response to the transmission of beam 232. Responses 224 may be the reflections of signals 222 off of one or more objects within sensor environment 200 in FIG. 2. In one illustrative example, number of sensors 400 is a number of light sensors. These light sensors may take various forms, such as, for example, solid state photo detectors, photo multipliers, or some other suitable type of light sensor. In some cases, number of sensors 400 may be or may include image sensors, depending on the particular implementation. For example, each of number of sensors 400 may be a camera or may include a camera.

In this illustrative example, processor unit 406 comprises hardware and software. In some cases, processor unit 406 may include firmware. Processor unit 406 may comprise a number of processors, depending on the implementation. Processor unit 406 processes responses 224 to generate second sensor information 226. In these illustrative examples, second sensor information 226 may include at least one of image data 414, distance 416, location 418, track 420, and other suitable information.

In these illustrative examples, image data 414 may include one or more images of the object of interest. The object of interest may be, for example, object 212. Image data 414 may be of a higher quality than image data 312 generated by passive sensor system 300 in these illustrative examples. Further, image data 414 may be image data for all or a portion of object 212 in these illustrative examples.

Distance 416 may be the distance from active sensor system 208 to the object of interest. This distance may also be referred to as a range. Location 418 of the object of interest may be identified by processor unit 406 using an angle of beam 232 transmitted by active sensor system 208. This angle may be relative to a reference plane in these illustrative examples. Further, track 420 generated by processor unit 406 may be more accurate than track 318 generated by passive sensor system 300.

As depicted, active sensor system 208 has field of view 422. Field of view 422 is narrower than field of view 326 in FIG. 3 in these illustrative examples.

Figure 5:
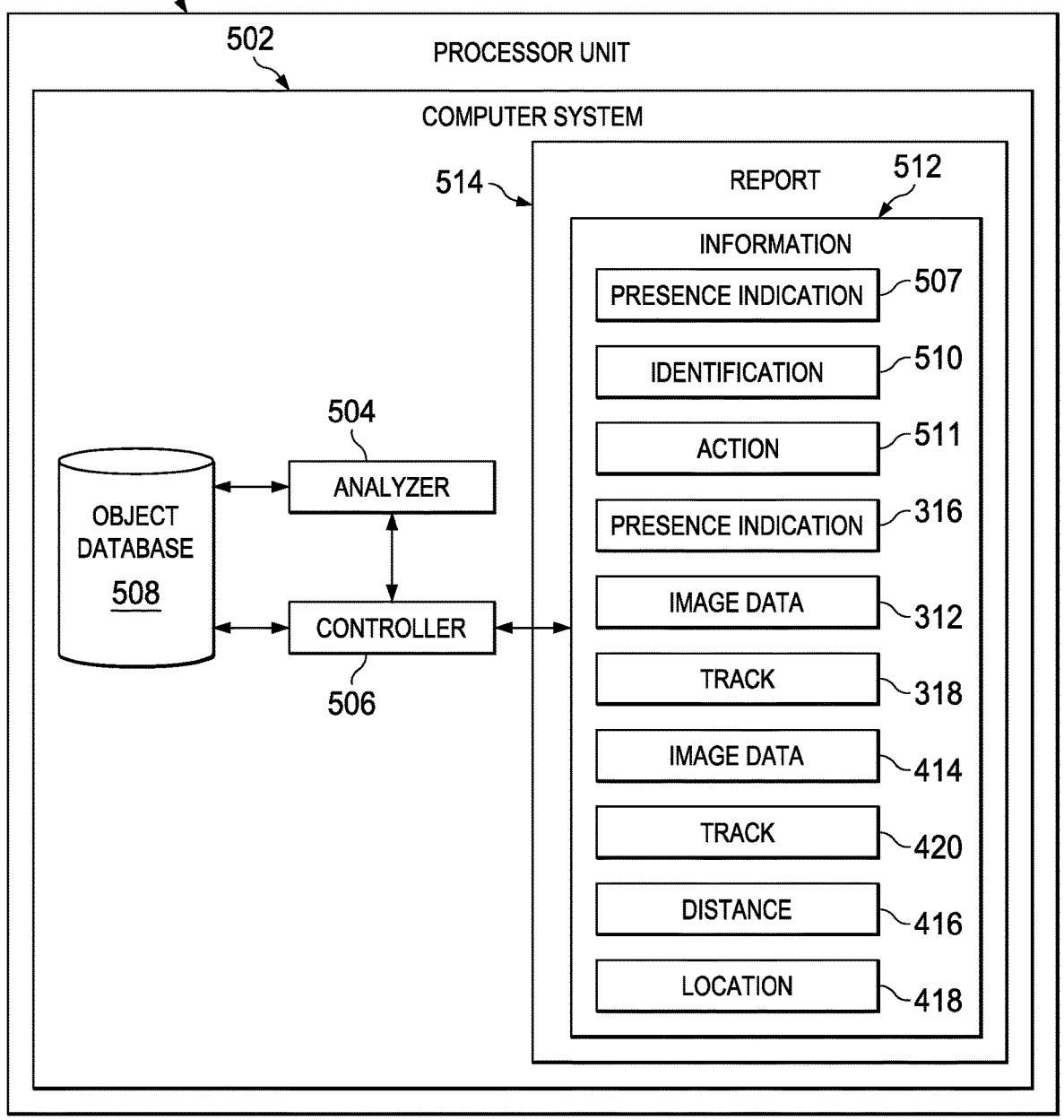
FIG. 5 is an illustration of a processor unit in accordance with an illustrative embodiment.

With reference now to FIG. 5, an illustration of a processor unit is depicted in accordance with an illustrative embodiment. Processor unit 500 is an example of an implementation for processor unit 210 in FIG. 2.

In this illustrative example, processor unit 500 is implemented using hardware and may include software and/or firmware. Processor unit 500 may comprise one or more processors. In particular, processor unit 500 may be implemented in computer system 502. Computer system 502 is comprised of one or more computers. When more than one computer is present, those computers may be in communication with each other using a medium, such as a wireless communications link, a local area network, or some other suitable medium.

Processor unit 500 may include analyzer 504 and controller 506. These components may take the form of hardware, software, firmware, or a combination of at least two of the three in processor unit 500.

Analyzer 504 is configured to process sensor information, such as sensor information 214 in FIG. 2. Sensor information 214 may include first sensor information 219 received from group of passive sensor systems 206 and/or second sensor information 226 received from active sensor system 208 in FIG. 2.

More specifically, analyzer 504 is configured to process at least one of first sensor information 219 and second sensor information 226 to detect an object in sensor environment 200, such as object 212. This detection may include, for example, detecting a presence of an object, tracking an object, identifying an object, and/or other suitable types of detection. In some cases, some of these functions may be performed by processor unit 304 in FIG. 3, processor unit 406 in FIG. 4, or both.

Analyzer 504 may generate presence indication 507 to indicate that the presence of an object has been detected. Further, analyzer 504 may analyze sensor information 214 and use object database 508 to identify an object to form identification 510 of the object. Identification 510 may identify the object as being friendly, unfriendly, unknown, or having some other characteristic. In some illustrative examples, identification 510 may identify the object as being a class of object, such as, for example, an aircraft, an airplane, a helicopter, a missile, a ship, a building, a person, a vehicle, an animal, a tree, or some other suitable class or type of object.

Additionally, analyzer 504 may identify action 511. Action 511 may be identified based on identification 510 of object 212. For example, if identification 510 indicates that an object is unfriendly, action 511 may be an alert indicating that further surveillance of the object is needed.

Presence indication 507, identification 510, and action 511 may be part of information 512 generated by processor unit 500 for the object of interest. Further, information 512 may also include at least a portion of sensor information 311 generated by passive sensor system 300 in FIG. 3 and/or at least a portion of second sensor information 226 generated by active sensor system 208 in FIG. 4.

For example, information 512 may include presence indication 316, image data 312 generated by passive sensor system 300, track 318, and/or other suitable information present in and/or derived from sensor information 311 in passive sensor system 300 in FIG. 3. Further, information 512 may include image data 414, track 420, distance 416, location 418, and/or other suitable information present in and/or derived from second sensor information 226 generated by active sensor system 208 in FIG. 4.

Further, depending on the implementation, processor unit 500 may use information generated by passive sensor system 300 in FIG. 3 and/or active sensor system 208 in FIG. 4 to generate additional information for inclusion in information 512. As one illustrative example, processor unit 500 may use track 318 and track 420 to identify an estimated track. This estimated track may be included in information 512 instead of track 318 and 420. In these illustrative examples, information 512 may be output as report 514.

Figure 6:
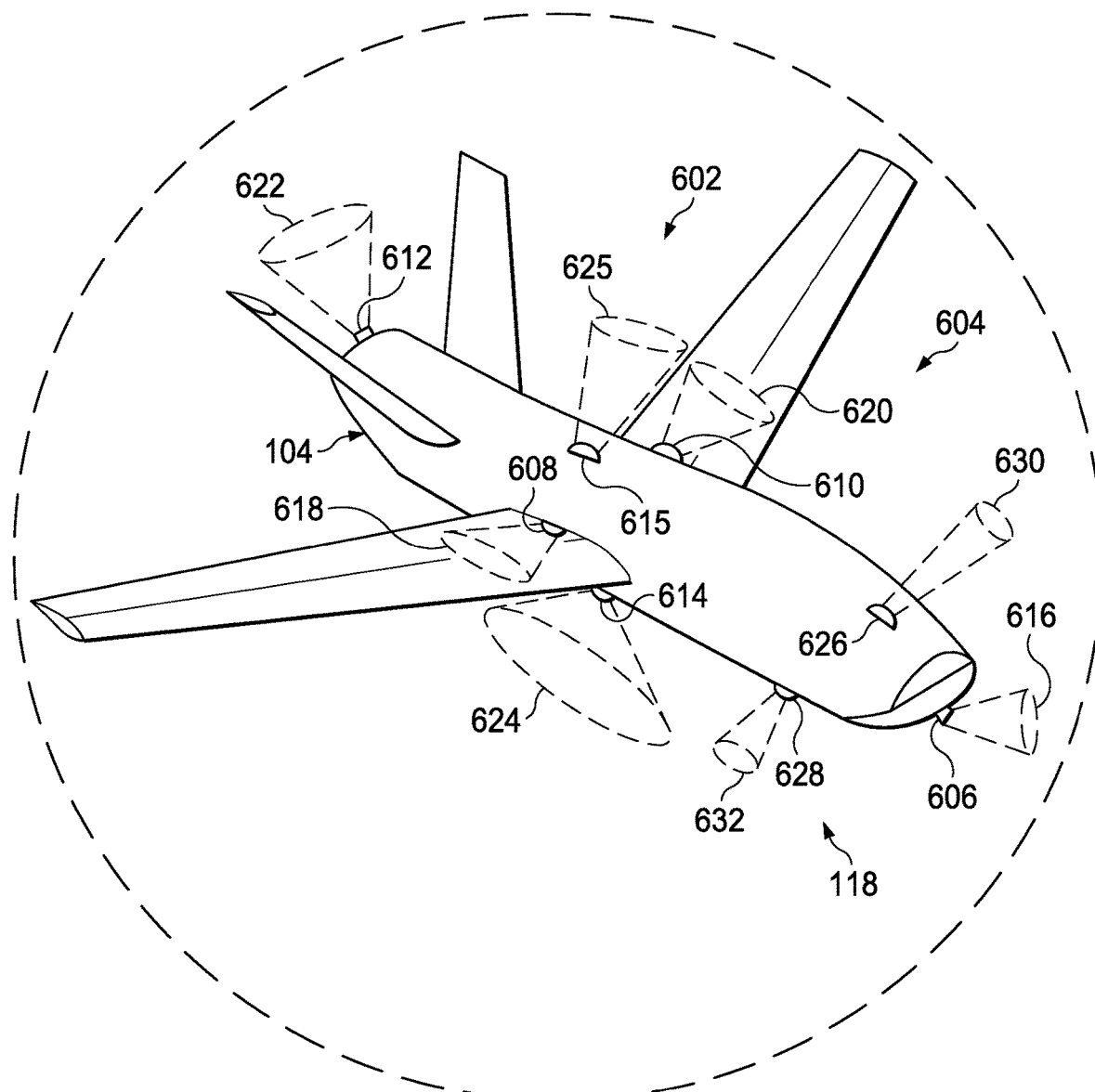
FIG. 6 is an illustration of an aircraft in accordance with an illustrative embodiment.

With reference now to FIG. 6, an illustration of an aircraft is depicted in accordance with an illustrative embodiment. In this illustrative example, a more detailed illustration of aircraft 104 with sensor system 118 is depicted. In these illustrative examples, sensor system 118 may be implemented using sensor system 202 in FIG. 2.

In this example, sensor system 118 comprises group of passive sensor systems 602. In particular, group of passive sensor systems 602 take the form of group of image sensor systems 604.

As depicted, sensor system 118 is distributed over different parts of aircraft 104. For example, group of image sensor systems 604 includes image sensor systems 606, 608, 610, 612, 614, and 615 in different locations of aircraft 104. Image sensor system 606 has field of view 616. Image sensor system 608 has field of view 618. Image sensor system 610 has field of view 620. Image sensor system 612 has field of view 622, and image sensor system 614 has field of view 624 in these illustrative examples. Image sensor system 615 has field of view 625. These fields of view may be combined to form a field of view for sensor system 118. The locations for the image sensor systems are selected to form a field of view for sensor system 118 that may be about four pi steradians in this illustrative example. In other words, these fields of view encompass substantially all of the environment around aircraft 104.

Additionally, sensor system 118 also includes active sensor system 626 and active sensor system 628. Active sensor system 626 has field of view 630, and active sensor system 628 has field of view 632.

The fields of view for the active sensor systems are smaller than the fields of view for the passive sensor systems in these illustrative examples. However, the combined field of regard for the active sensor systems and the combined field of regard for the passive sensor systems may be substantially equal in this illustrative example. As used herein, the "field of regard" may be the angular area within which a sensor system is capable of detecting, for example, light. For example, the combined field of regard for the active sensor systems and the combined field of regard for the passive sensor systems may be about four pi steradians. The field of view for active sensor systems 626 and active sensor system 628 may be moveable to direct signals towards an object that may be identified using the passive sensor systems in these illustrative examples.

The illustration of sensor system 118 in FIG. 6 for aircraft 104 in FIG. 1 is not meant to imply physical or architectural limitations to the manner in which sensor system 118 may be implemented. In other illustrative examples, other numbers of image sensor systems and locations for image sensor systems may be used. In some illustrative examples, the field of view may not be about four pi steradians, but may be a smaller field of view.

In still other illustrative examples, some other number of active sensor systems may be employed. For example, a single active sensor system, four active sensor systems, or some other number of sensor systems may be used with aircraft 104.

Figure 7:
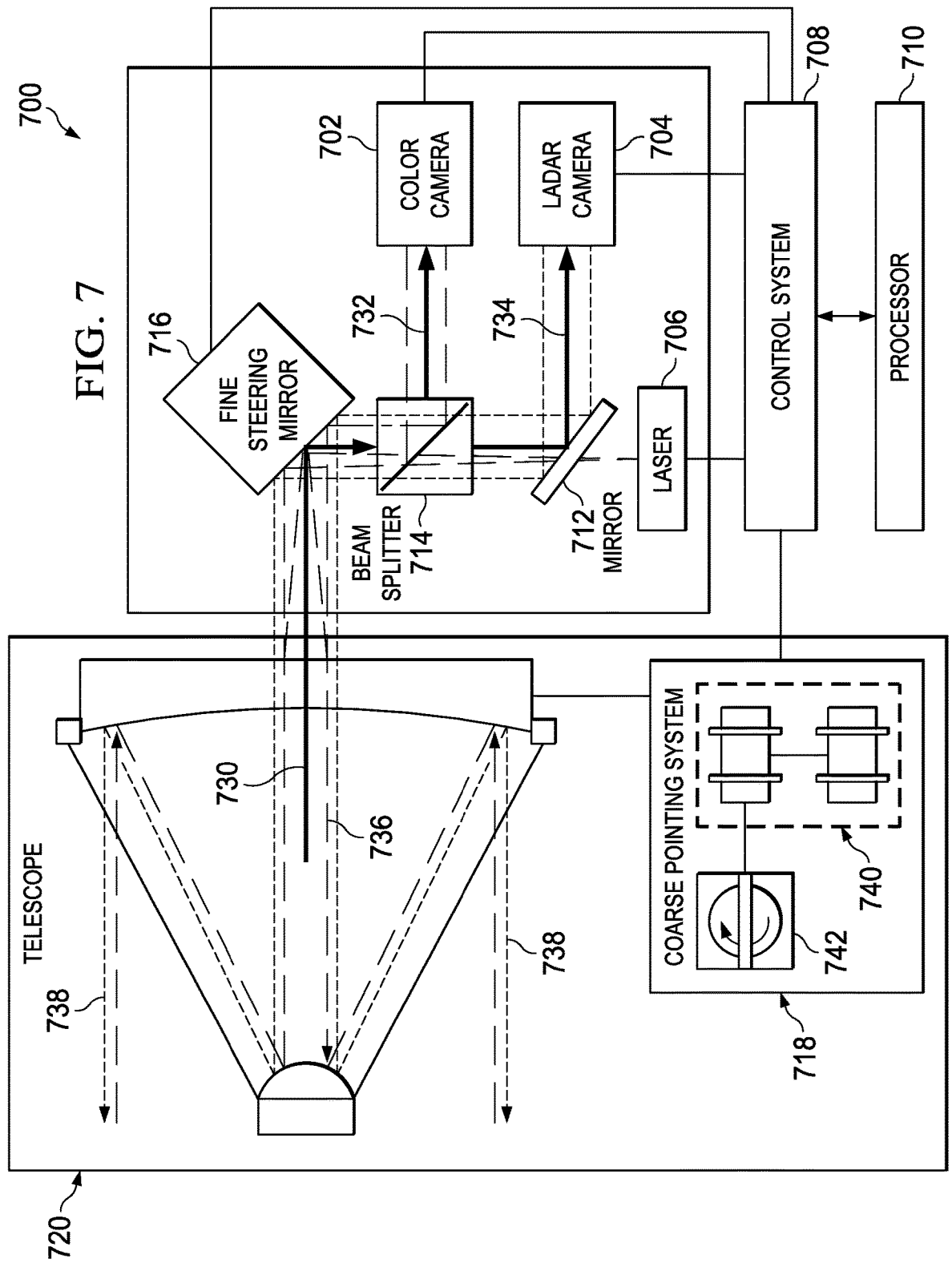
FIG. 7 is an illustration of an active sensor system in accordance with an illustrative embodiment.

Turning now to FIG. 7, an illustration of a sensor system is depicted in accordance with an illustrative embodiment. Sensor system 700 is an example of a sensor system that may be used to implement sensor system 118 and is an example of an implementation of sensor system 202 shown in block form in FIG. 2.

As illustrated, sensor system 700 includes color camera 702, laser detection and ranging (LADAR) camera 704, laser 706, control system 708, processor 710, mirror 712, beam splitter 714, fine steering mirror 716, coarse pointing system 718, and telescope 720. In these illustrative examples, color camera 702 is part of an image sensor system. Color camera 702 is configured to generate image data from light or other signals received from sensor system 700. Laser detection and ranging camera 704 and laser 706 are part of a laser detection and ranging system. Laser 706 is configured to send signals in the form of a laser beam and laser detection and ranging camera 704 is configured to receive responses to the signals and generate image data.

In this illustrative example, telescope 720 may be configured to transmit signals, receive responses, receive light, and transmit and/or receive other types of signals or electromagnetic radiation. In this illustrative example, telescope 720 is a reflecting telescope. In this illustrative example, signals received by telescope 720 may be sent to color camera 702 and laser detection and ranging camera 704 using fine steering mirror 716, beam splitter 714, and mirror 712. For example, light detected by telescope 720 is sent to fine steering mirror 716 along path 730 in the form of one or more light beams. In turn, fine steering mirror 716 sends these light beams to beam splitter 714. Beam splitter 714 is configured to split the light beams such that the light beams are directed to both color camera 702 and laser detection and ranging camera 704. A portion of the light is directed to color camera 702 along path 732. Another portion of the light is directed to mirror 712 along path 734, which directs the light to laser detection and ranging camera 704.

In sending signals, laser 706 generates a laser beam that travels along path 736. Path 736 extends through mirror 712 and beam splitter 714 and is directed by fine steering mirror 716 to telescope 720. Telescope 720 reflects the laser beam outwards along path 738.

The laser beam may be steered using coarse pointing system 718. Coarse pointing system 718 includes motor system 740 and gyroscope 742. Motor system 740 changes the position of telescope 720. Gyroscope 742 sends signals to motor system 740 to compensate for movement of a platform on which sensor system 700 is mounted. Additional corrections to the direction of the laser beam may be made using fine steering mirror 716. Fine steering mirror 716 may make smaller corrections as compared to coarse pointing system 718.

Control system 708 contains one or more processor units and controls various components in sensor system 700. For example, control system 708 may control the operation of coarse pointing system 718 and fine steering mirror 716. Additionally, control system 708 also may control the operation of laser 706, color camera 702, and laser detection and ranging camera 704. Further, control system 708 also may receive sensor information from color camera 702 and laser detection and ranging camera 704. Control system 708 may process this sensor information and send the processed sensor information to processor 710.

Processor 710 manages the operation of sensor system 700. Processor 710 may send reports, receive commands from an operator, identify objects from sensor information, and generate information about objects using the sensor information. Fine steering mirror 716 may also be controlled to scan a small angular region surrounding a particular distance, location, and/or track of an object identified previously.

The illustration of sensor system 700 is not meant to imply physical or architectural limitations to the manner in which an illustrative embodiment may be implemented. Sensor system 700 is only an example of one implementation for sensor system 202 in FIG. 2. For example, in other illustrative embodiments, additional color cameras may be present that have different fields of view from color camera 702. In other illustrative examples, color camera 702 may have a different field of view from laser detection and ranging camera 704. In still another illustrative example, a microwave transmitter may be used in place of a laser, depending on the particular implementation.

The different components shown in FIGS. 1, 6, and 7 may be combined with components in FIGS. 2-5, used with components in FIGS. 2-5, or a combination of the two. Additionally, some of the components in FIGS. 1, 6, and 7 may be illustrative examples of how components shown in block form in FIGS. 2-5 can be implemented as physical structures.

Figure 8:
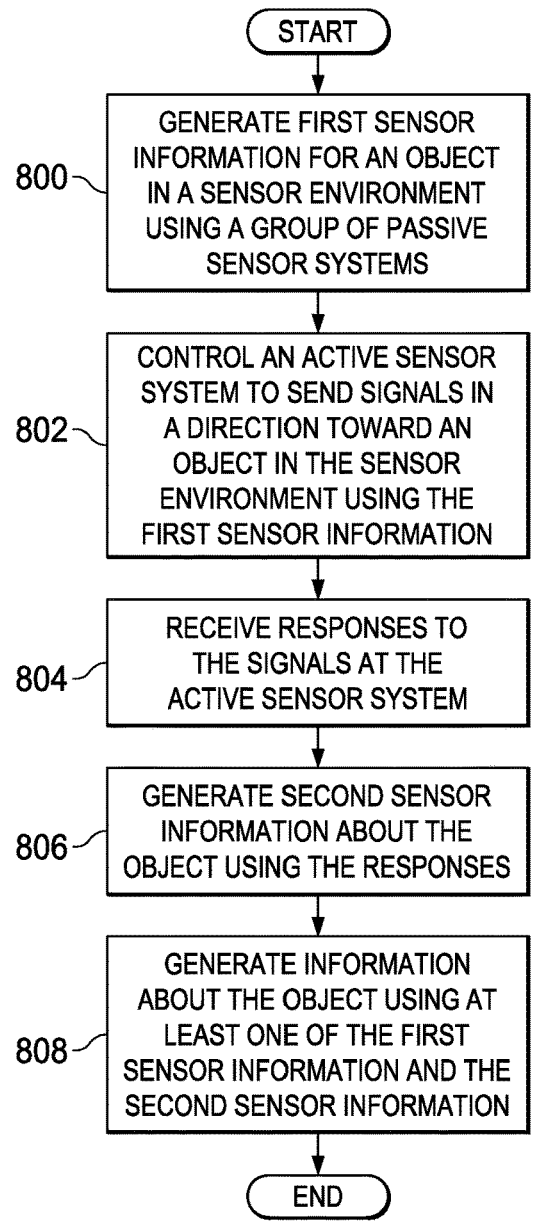
FIG. 8 is an illustration of a flowchart of a process for detecting objects in accordance with an illustrative embodiment.

Turning now to FIG. 8, an illustration of a flowchart of a process for detecting objects is depicted in accordance with an illustrative embodiment. The process illustrated in FIG. 8 may be implemented in sensor environment 200 in FIG. 2. In particular, this process may be implemented using sensor system 202 in FIG. 2.

The process begins by generating first sensor information for an object in a sensor environment using a group of passive sensor systems (operation 800). The first sensor information may include at least one of, for example, without limitation, image data, a presence indication indicating the presence of an object in the sensor environment, a direction vector to an object detected, a track for an object detected, and other suitable information.

The process then controls an active sensor system to send signals in a direction toward an object in the sensor environment using the first sensor information (operation 802). In operation 802, the active sensor system may be controlled using, for example, a direction vector in the first sensor information. In some cases, the active sensor system may be controlled to direct the signals toward the object using an estimated location or direction for the object derived using the first sensor information.

The process then receives responses to the signals at the active sensor system (operation 804) and generates, by the active sensor system, second sensor information about the object using the responses (operation 806). The second sensor information may include, for example, without limitation, an identification of the object, a location of the object, a track for the object, and/or other suitable information. The information about the object present in the second sensor information may be more accurate than the information about the object present in the first sensor information.

The process then generates information about the object using at least one of the first sensor information and the second sensor information (operation 808), with the process terminating thereafter. This information about the object may include at least one of a portion of the first sensor information, a portion of the second sensor information, information derived from these two sets of information, and/or other suitable information. In operation 808, the information may be generated in the form of a report.

Figure 9:
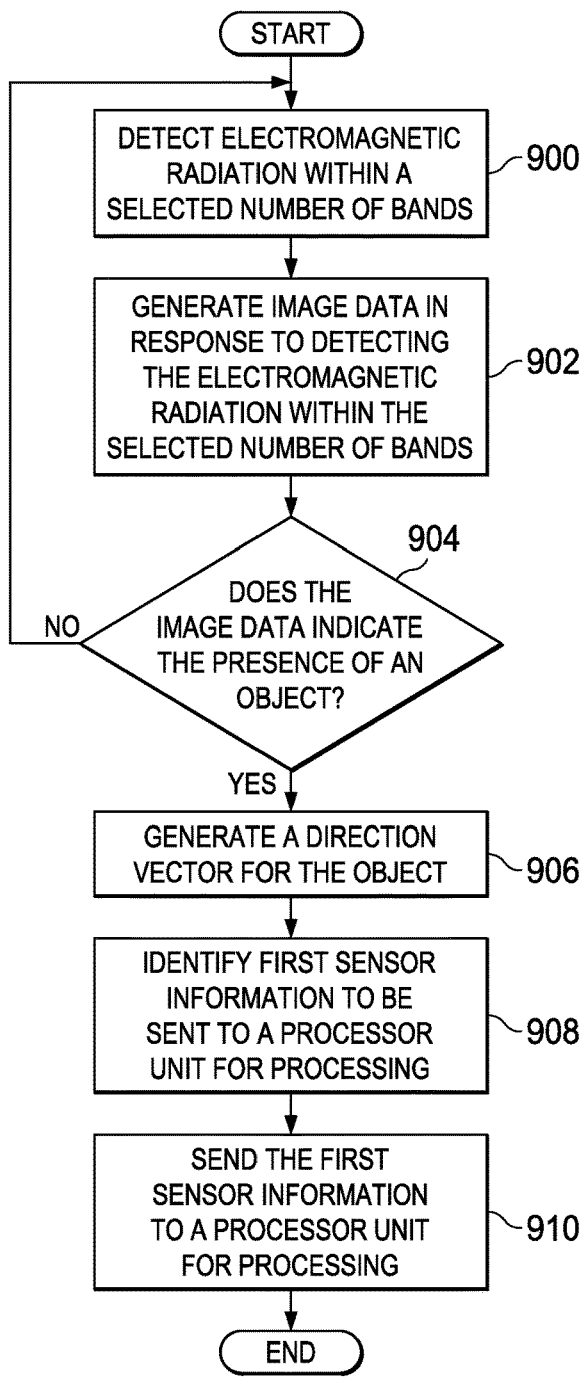
FIG. 9 is an illustration of a flowchart of a process for generating first sensor information for an object in accordance with an illustrative embodiment.

With reference now to FIG. 9, an illustration of a flowchart of a process for generating first sensor information for an object is depicted in accordance with an illustrative embodiment. The process illustrated in FIG. 9 may be implemented using group of passive sensor systems 206 in FIG. 2. The process illustrated in FIG. 9 may be an example of one implementation for the process described in FIG. 8.

The process begins by a group of passive sensor systems detecting electromagnetic radiation within a selected number of bands (operation 900). The group of passive sensor systems is part of a sensor system that also includes an active sensor system. Further, in this illustrative example, the group of passive sensor systems and the active sensor system are associated with a platform.

In operation 900, the selected number of bands may fall within the range of spectral frequencies for visible light, infrared light, ultraviolet light, near-infrared light, or some other suitable region within the electromagnetic spectrum. In this illustrative example, the selected number of bands may be within the range of frequencies for infrared light.

The group of passive sensor systems generates image data in response to detecting the electromagnetic radiation within the selected number of bands (operation 902). The group of passive sensor systems then determines whether the image data indicates the presence of an object (operation 904). Operation 904 may be performed using any number of algorithms currently available for object detection. In some cases, the group of passive sensor systems may determine whether detection criteria for an object are met using the image data.

If the group of passive sensor systems determines that the image data does not indicate the presence of an object, the process returns to operation 900 as described above. Otherwise, if the group of passive sensor systems determines that the image data indicates the presence of an object, the group of passive sensor systems generates a direction vector for the object (operation 906). In operation 906, the direction vector may point to a direction of the object relative to the group of passive sensor systems. In some cases, the group of passive sensor systems may generate a direction vector with respect to a platform with which the group of passive sensor systems is associated.

Thereafter, the group of passive sensor systems identifies first sensor information to be sent to a processor unit for processing (operation 908). In this illustrative example, the first sensor information identified in operation 908 may include the direction vector, a presence indication for the object, the image data, and/or other suitable information identified by the group of passive sensor systems.

The group of passive sensor systems then sends the first sensor information to a processor unit for processing (operation 910), with the process terminating thereafter. Depending on the implementation, the processor unit may be part of the active sensor system or a separate processor unit.

Figure 10:
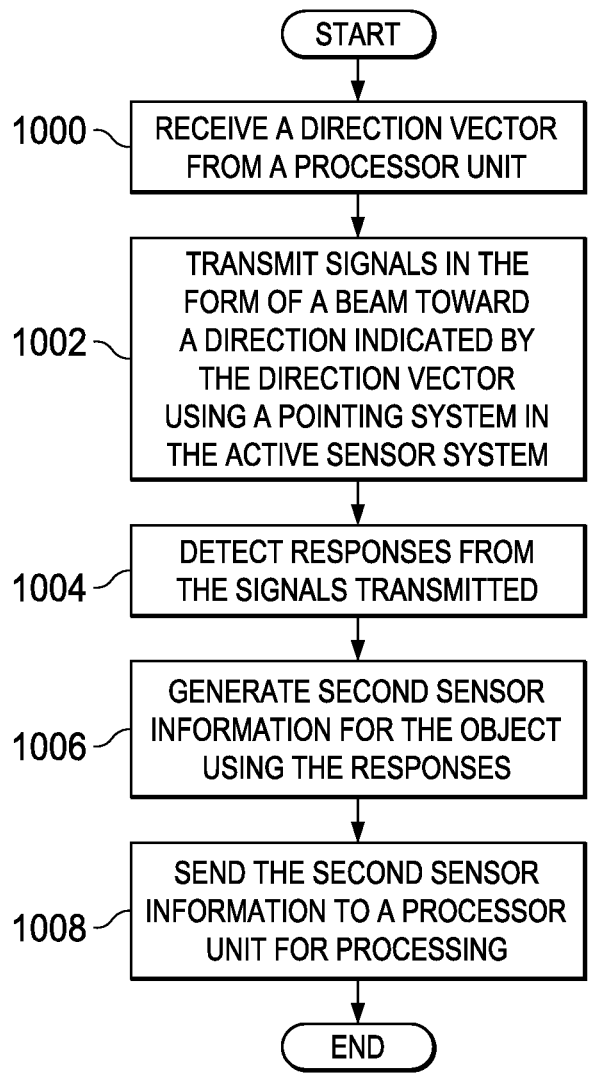
FIG. 10 is an illustration of a flowchart of a process for generating second sensor information in accordance with an illustrative embodiment.

With reference now to FIG. 10, an illustration of a flowchart of a process for generating second sensor information is depicted in accordance with an illustrative embodiment. The process illustrated in FIG. 10 may be implemented using active sensor system 208 in FIG. 2.

The process begins by an active sensor system receiving a direction vector from a processor unit (operation 1000). In this illustrative example, the active sensor system may be part of the same sensor system as the group of passive sensor systems described in FIG. 9. The direction vector received in operation 1000 may be the direction vector generated by the group of passive sensor systems in operation 906.

The active sensor system then transmits signals in the form of a beam toward a direction indicated by the direction vector using a pointing system in the active sensor system (operation 1002). In particular, the active sensor system points the beam in a direction towards an object detected by the group of passive sensor systems.

The active sensor system then detects responses from the signals transmitted (operation 1004). In operation 1004, the responses detected may be reflections of the signals off of the object towards which the beam was pointed.

Thereafter, the active sensor system generates second sensor information for the object using the responses (operation 1006). The second sensor information may include, for example, without limitation, a track for the object, a location of the object, an identification of the object, a speed of the object, and/or other suitable information. The active sensor system sends the second sensor information to a processor unit for processing (operation 1008), with the process terminating thereafter.

Figure 11:
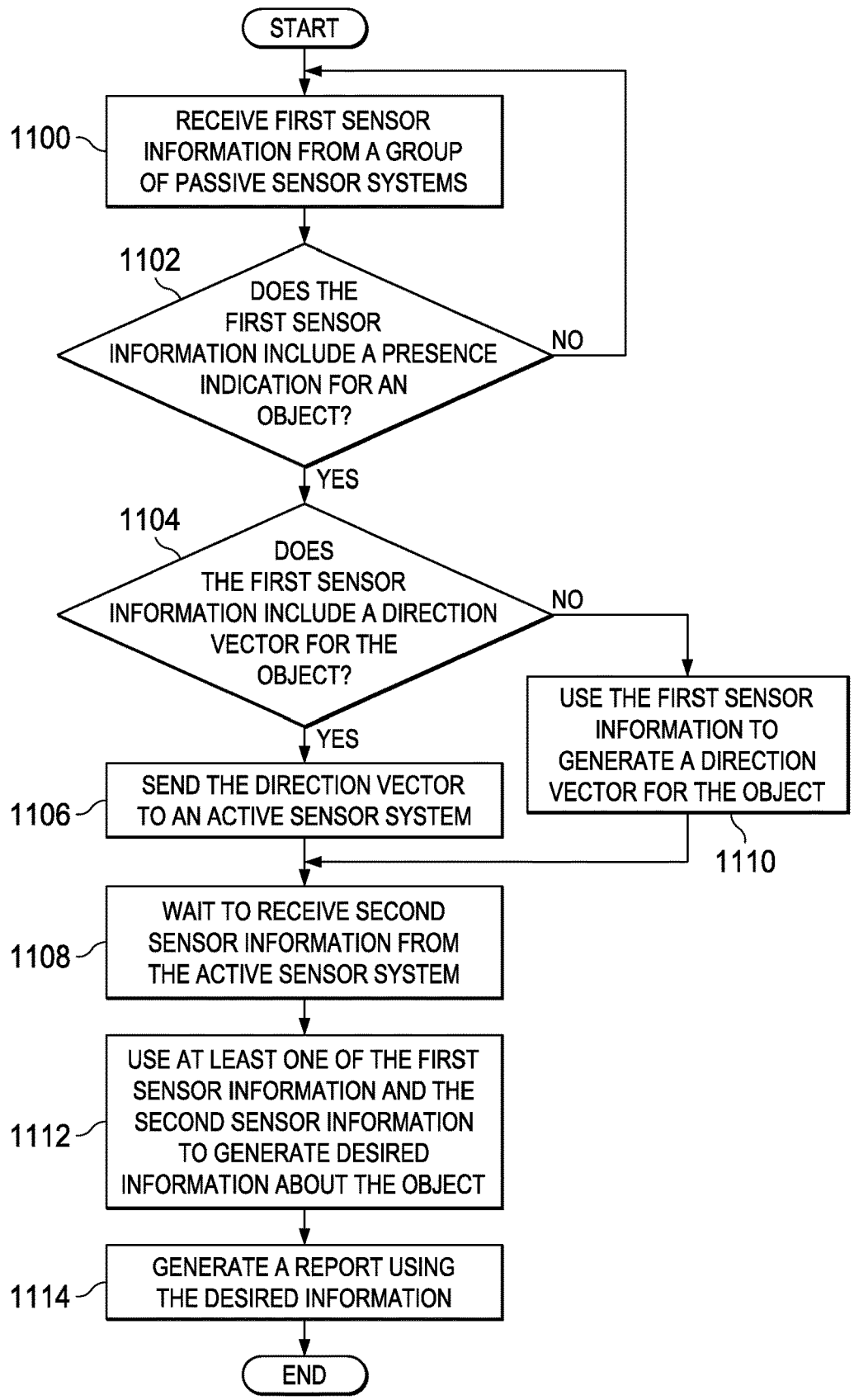
FIG. 11 is an illustration of a flowchart of a process for processing sensor information in accordance with an illustrative embodiment.

With reference now to FIG. 11, an illustration of a flowchart of a process for processing sensor information is depicted in accordance with an illustrative embodiment. The process illustrated in FIG. 11 may be implemented using processor unit 210 in FIG. 2.

The process begins by the processor unit receiving first sensor information from a group of passive sensor systems (operation 1100). The first sensor information may be, for example, the first sensor information sent from the group of passive sensor systems in operation 910 in FIG. 9. The processor unit determines whether the first sensor information includes a presence indication for an object (operation 1102).

If the first sensor information does not include a presence indication for an object, the process returns to operation 1100 as described above. Otherwise, if the first sensor information includes a presence indication for an object, the processor unit determines whether the first sensor information includes a direction vector for the object (operation 1104).

If the first sensor information includes a direction vector for the object, the processor unit sends this direction vector to an active sensor system (operation 1106). The processor unit then waits to receive second sensor information from the active sensor system (operation 1108). With reference again to operation 1104, if the first sensor information does not include a direction vector for the object, the processor unit uses the first sensor information to generate a direction vector for the object (operation 1110). The process then proceeds to operation 1108 as described above.

After the second sensor information has been received in operation 1108, the processor unit uses at least one of the first sensor information and the second sensor information to generate desired information about the object (operation 1112). This desired information may include at least one of the first sensor information, the second sensor information, actions to be performed, commands, other information derived from the first sensor information and/or the second sensor information, as well as other suitable information.

The processor unit then generates a report using the desired information (operation 1114), with the process terminating thereafter. The report may be used by another processor unit, an operator, a robotic operator, or some other suitable type of operator or system to perform actions in response to the detection of the object.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. In some cases, one or more of the blocks may be implemented in firmware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 12, an illustration of a data processing system is depicted in accordance with an illustrative embodiment. Data processing system 1200 may be used to implement computer system 502 in FIG. 5. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software and/or firmware that may be loaded into memory 1206. Processor unit 1204 may be a number of processors, a multi-processor core, or some other type of processor, depending on the particular implementation. In the illustrative examples, processor unit 1204 is an example of a processor unit that may be used to implement processor unit 210 in FIG. 2, processor unit 304 in passive sensor system 300 in FIG. 3, and processor unit 406 in active sensor system 208 in FIG. 4.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226.

In these illustrative examples, computer readable storage media 1224 is a physical or tangible storage device used to store program code 1218 rather than a medium that propagates or transmits program code 1218. Alternatively, program code 1218 may be transferred to data processing system 1200 using computer readable signal media 1226. Computer readable signal media 1226 may be, for example, a propagated data signal containing program code 1218.

For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 12 can be varied from the illustrative examples shown. The different embodiments may be implemented using any hardware device or system capable of running program code 1218.

Thus, the different illustrative embodiments provide a method and apparatus for generating desired information about an object. In one illustrative embodiment, an apparatus comprises a group of passive sensor systems, an active sensor system, and a processor unit. The group of passive sensor systems is configured to generate first sensor information from light in an environment around the group of passive sensor systems. The active sensor system is configured to send signals, receive responses from the signals, and generate second sensor information from the responses. The processor unit is configured to control the active sensor system to send the signals in a direction toward an object based on the first sensor information. Further, the processor unit is configured to generate desired information about the object using at least one of the first sensor information and the second sensor information.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for detecting an object around a platform, the apparatus comprising:
    an image sensor system configured to generate first sensor information from a light beam;
    an active sensor system configured to generate second sensor information from the light beam, wherein the active sensor system comprises one of a light detection and ranging system (LIDAR) and a laser detection and ranging system (LADAR);
    a beam splitter configured to split the light beam to direct a first portion of the light beam to the image sensor system and a second portion of the light beam to the active sensor system;
    a coarse pointing system configured to change a position of the telescope to steer a direction of a laser beam directed outward from an aircraft, wherein the coarse pointing system comprises a gyroscope and a motor system, and wherein the gyroscope sends signals to the motor system to compensate for movement of the platform on which the image sensor system and the active sensor system are mounted; and
    a processor unit in communication with the image sensor system and the active sensor system, the processor unit configured to generate information about the object using the first sensor information and the second sensor information.

2. The apparatus of claim 1, wherein the information about the object comprises at least one of a distance to the object, a direction vector to the object, a location of the object, an identification of the object, a track for the object, and a determination of whether the object is a threat.

3. The apparatus of claim 1, wherein the processor unit is configured to perform at least one of determining whether the object is present, identifying the object, identifying a direction vector to the object, and generating a track for the object using at least one of the first sensor information and the second sensor information.

4. The apparatus of claim 1, wherein the active sensor system is configured to perform at least one of identifying a distance to the object and a location of the object.

5. The apparatus of claim 1, wherein the image sensor system is configured to detect electromagnetic radiation within a plurality of bands.

6. The apparatus of claim 5, wherein the plurality of bands is within a spectral region in an electromagnetic spectrum for one of visible light, infrared light, ultraviolet light, and near-infrared light.

7. The apparatus of claim 1, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a dam, a manufacturing facility, and a building.

8. The apparatus of claim 1, wherein the image sensor system comprises a color camera.

9. The apparatus of claim 1 further comprising:
    a telescope configured to receive the light beam;
    the coarse pointing system configured to change a position of the telescope; and
    wherein the processor unit is in communication with the coarse pointing system and is configured to control the coarse pointing system to change the position of the telescope.

10. The apparatus of claim 9, wherein:
    the telescope is configured to direct a laser beam outward from the platform;
    the coarse pointing system is configured change the position of the telescope to steer a direction of the laser beam directed outward from the platform;
    the active sensor system comprises a laser configured to generate the laser beam; and
    the processor unit is configured to control the coarse pointing system to change the position of the telescope to steer the direction of the laser beam directed outward from the platform and to control operation of the laser to generate the laser beam.

11. The apparatus of claim 10 further comprising:
    a fine steering mirror configured to direct the light beam from the telescope to the beam splitter and configured to direct the laser beam from the beam splitter to the telescope;
    a mirror configured to direct the second portion of the light beam from the beam splitter to the active sensor system, wherein the laser beam generated by the laser passes through the mirror and the beam splitter to the fine steering mirror; and
    wherein the processor unit is in communication with the fine steering mirror and is configured to control the fine steering mirror to make corrections to the direction of the laser beam.

12. A method for detecting an object, the method comprising:
    splitting a light beam by a beam splitter to direct a first portion of the light beam to an image sensor system and a second portion of the light beam to an active sensor system;
    changing a position of the telescope with a coarse pointing system to steer the direction of the light beam directed outward from an aircraft, wherein the coarse pointing system comprises a gyroscope and a motor system, and wherein the gyroscope sends signals to a motor system to compensate for movement of a platform on which the image sensor system and the active sensor system are mounted;
    receiving first sensor information for the object from the image sensor system, wherein the image sensor system generates the first sensor information from the light beam;

receiving second sensor information for the object from the active sensor system, wherein the active sensor system generates the second sensor information from the light beam; and generating information about the object using the first sensor information and the second sensor information.

13. The method of claim 12, wherein the information about the object comprises at least one of a distance to the object, a direction vector to the object, a location of the object, an identification of the object, a track for the object, and a determination of whether the object is a threat.

14. The method of claim 12, wherein generating the information about the object using at the least one of the first sensor information and the second sensor information comprises:

determining whether the object is a threat.

15. The method of claim 12, wherein the image sensor system comprises a color camera.

16. The method of claim 12 further comprising:
receiving the light beam by a telescope; and
changing a position of the telescope by a coarse pointing system.

17. The method of claim 16 further comprising:
generating a laser beam by a laser in the active sensor system;
directing the laser beam by the telescope; and
changing the position of the telescope by the coarse pointing system to steer a direction of the laser beam.

18. The method of claim 17 further comprising:
directing the light beam from the telescope to the beam splitter by a fine steering mirror;
directing the laser beam from the beam splitter to the telescope by the fine steering mirror;
directing the second portion of the light beam from the beam splitter to the active sensor system by a mirror, wherein the laser beam generated by the laser passes through the mirror and the beam splitter to the fine steering mirror; and
controlling the fine steering mirror to make corrections to the direction of the laser beam.

19. An aircraft comprising:
a fuselage;
a wing; and
an apparatus for detecting threats around the aircraft, comprising:
a platform;
a telescope configured to receive a light beam and to direct a laser beam outward from the aircraft;
a coarse pointing system configured to change a position of the telescope to steer a direction of the laser beam directed outward from the aircraft, wherein the coarse pointing system comprises a gyroscope and a motor system, and wherein the gyroscope sends signals to the motor system to compensate for movement of the platform, and wherein the motor system changes the position of the telescope according to the signals;
an image sensor system mounted on the platform and configured to generate first sensor information from the light beam;
an active sensor system mounted on the platform and comprising a laser configured to generate the laser beam and a laser detection and ranging (LADAR) camera configured to generate second sensor information from the light beam;
a beam splitter configured to split the light beam received by the telescope direct a first portion of the light beam to the image sensor system and a second portion of the light beam to the active sensor system; and
a processor unit in communication with the coarse pointing system, the image sensor, and the active sensor system, wherein the processor unit is configured to control the coarse pointing system to change the position of the telescope to steer the direction of the laser beam directed outward from the aircraft, to control operation of the laser to generate the laser beam, and to generate information about an object using the first sensor information and the second sensor information, wherein the information about the object comprises a determination of whether the object is a threat.

20. The aircraft of claim 19, wherein the apparatus for detecting threats around the aircraft further comprises:
a fine steering mirror configured to direct the light beam from the telescope to the beam splitter and configured to direct the laser beam from the beam splitter to the telescope;
a mirror configured to direct the second portion of the light beam from the beam splitter to the LADAR camera, wherein the laser beam generated by the laser passes through the mirror and the beam splitter to the fine steering mirror; and
wherein the processor unit is in communication with the fine steering mirror and is configured to control the fine steering mirror to make corrections to the direction of the laser beam.

21. The aircraft of claim 19, wherein the information about the object comprises at least one of a distance to the object, a direction vector to the object, a location of the object, an identification of the object, a track for the object, and a determination of whether the object is a threat.

22. The aircraft of claim 19, wherein the processor unit is configured to perform determining whether the object is present.

23. The aircraft of claim 19, wherein the processor unit is configured to perform identifying the object.

24. The aircraft of claim 19, wherein the processor unit is configured to perform identifying a direction vector to the object.

25. The aircraft of claim 19, wherein the processor unit is configured to perform generating a track for the object using at least one of the first sensor information and the second sensor information.

26. The aircraft of claim 19, wherein the active sensor system is configured to perform identifying a distance to the object.

27. The aircraft of claim 19, wherein the active sensor system is configured to perform identifying a location of the object.

28. The aircraft of claim 19, wherein the image sensor system is configured to detect electromagnetic radiation within a plurality of bands.

29. The aircraft of claim 28, wherein the plurality of bands is within a spectral region in an electromagnetic spectrum for one of visible light, infrared light, ultraviolet light, and near-infrared light.

* * * * *